United States Patent
Shao

(10) Patent No.: US 9,800,170 B2
(45) Date of Patent: Oct. 24, 2017

(54) ENERGY HARVESTER OPEN-CIRCUIT VOLTAGE SENSING FOR MPPT

(71) Applicant: Analog Devices Global, Hamilton (BM)

(72) Inventor: Bin Shao, Shanghai (CN)

(73) Assignee: Analog Devices Global, Hamilton (BM)

( * ) Notice: Subject to any disclaimer, the term of this patent is extended or adjusted under 35 U.S.C. 154(b) by 165 days.

(21) Appl. No.: 14/939,267

(22) Filed: Nov. 12, 2015

(65) Prior Publication Data

US 2017/0117818 A1    Apr. 27, 2017

Related U.S. Application Data

(63) Continuation of application No. PCT/CN2015/092545, filed on Oct. 22, 2015.

(51) Int. Cl.
*H02M 1/00* (2006.01)
*H02M 7/06* (2006.01)

(52) U.S. Cl.
CPC .................................. *H02M 7/066* (2013.01)

(58) Field of Classification Search
CPC ......... H02M 3/156; H02M 2003/1552; H02M 3/155; H02M 3/145; H02M 3/158;
(Continued)

(56) References Cited

U.S. PATENT DOCUMENTS

| | | |
|---|---|---|
| 4,604,567 A | 8/1986 | Chetty |
| 5,869,956 A | 2/1999 | Nagao et al. |

(Continued)

FOREIGN PATENT DOCUMENTS

| | | |
|---|---|---|
| CN | 102354110 A | 2/2012 |
| CN | 102902298 A | 1/2013 |

(Continued)

OTHER PUBLICATIONS

Ahmad, Jawad, et al., "A Voltage Based Maximum Power Point Tracker for Low Power and Low Cost Photovoltaic Applications", *World Academy of Science, Engineering and Technology*, 60, (2009), 712-715.

(Continued)

*Primary Examiner* — Adolf Berhane
*Assistant Examiner* — Afework Demisse
(74) *Attorney, Agent, or Firm* — Schwegman Lundberg & Woessner, P.A.

(57) ABSTRACT

Apparatus and techniques described herein can include using an electronic circuit comprising a rectifier circuit, an open-circuit voltage (OCV) sampling circuit coupled to the output of the rectifier circuit, and a regulator circuit coupled to the output of the rectifier circuit. In an example, an isolation switch can be located between the regulator circuit and the rectifier circuit, the isolation switch configured to isolate the regulator circuit from the rectifier circuit for sampling of the open-circuit voltage by the open-circuit voltage sampling circuit. In another example, a buffer circuit can be used, such as placed in-line with a divider circuit between a divider circuit and an open-circuit voltage sampling capacitor. In this manner, the buffer circuit can provide a low output impedance, isolating the voltage sampling capacitor from the divider circuit.

20 Claims, 9 Drawing Sheets

(58) Field of Classification Search
CPC ........ H02M 3/1588; H02M 2003/1566; G05F 1/613; G05F 1/618
See application file for complete search history.

(56) References Cited

U.S. PATENT DOCUMENTS

| | | | |
|---|---|---|---|
| 6,111,767 | A | 8/2000 | Handleman |
| 6,339,538 | B1 | 1/2002 | Handleman |
| 8,422,249 | B2 | 4/2013 | Cooper et al. |
| 2008/0074095 | A1* | 3/2008 | Telefus ................ H02M 1/10 323/282 |
| 2013/0043857 | A1 | 2/2013 | Ramadass et al. |
| 2013/0043858 | A1 | 2/2013 | Ramadass et al. |
| 2013/0169176 | A1* | 7/2013 | Pan .................... H05B 33/0815 315/200 R |
| 2015/0123649 | A1 | 5/2015 | Shao et al. |

FOREIGN PATENT DOCUMENTS

| | | |
|---|---|---|
| WO | WO-2011/003971 A1 | 1/2011 |
| WO | WO-2013/049184 A2 | 4/2013 |

OTHER PUBLICATIONS

Freeman, Dave, "Introduction to Photovoltaic Systems Maximum Power Point Tracking", Texas Instruments, Application Report, SLVA446—Nov. 2010, (Nov. 2010), 8 pgs.

Mateu, Loreto, et al, "Analog Maximum Power Point Circuit Applied to Thermagenerators", *PowerMEMS 2008*, Sendai, Japan, Nov. 9-12, 2008, (Nov. 2008), 461-464.

Sharama, Prashant, et al., "A MPPT Based Solar Charge Controller", Abstract for Indian Application Serial No. 940DEL2008, filed Apr. 10, 2008, 2 pgs.

Simjee, F. I, et al., "Efficient Charging of Supercapacitors for Extended Lifetime of Wireless Sensor Nodes", *IEEE Transactions on Power Electronics*, 23(3), (May 2008), 1526-1536.

"U.S. Appl. No. 14/098,181, Non Final Office Action mailed Feb. 1, 2017", 7 pgs.

"U.S. Appl. No. 14/098,181, Response Filed Nov. 8, 2016 to Restriction Requirement mailed Aug. 8, 2016", 10 pgs.

"U.S. Appl. No. 14/098,181, Restriction Requirement mailed Aug. 8, 2016", 6 pgs.

* cited by examiner

ENERGY HARVESTER OPEN-CIRCUIT VOLTAGE SENSING FOR MPPT

CLAIM OF PRIORITY

This application is a continuation under 35 U.S.C. §111(a) and claims benefit of priority to International Patent Application Serial No. PCT/CN2015/092545, filed on Oct. 22, 2015, which is hereby incorporated by reference herein in its entirety.

BACKGROUND

Electrical energy can be harvested or generated using a variety of techniques. For example, an energy source can include a mechanical-to-electrical conversion device such as a piezoelectric energy harvesting (PEH) device. Another example of an energy source can include a photovoltaic (PV) device, such as a solar cell or a solar array. Yet another example of an energy source can include a thermo-electric generator (TEG). Use of a PEH device, PV device, a TEG, or other energy sources can include coupling such an energy source to a load to provide operating energy for the load. However, there can be a detrimental effect on energy conversion efficiency or power transfer efficiency if the load current or voltage requirements are badly mismatched to the output characteristics of the energy source.

Overview

An energy source can be coupled to a load, such as using a power conversion circuit. The operation of the power conversion circuit can be adjusted using information about the energy source, such as to enhance the efficiency of energy transfer between the energy source and the load. In an example, the energy source can include a piezoelectric energy harvesting (PEH) device. In one approach, the power conversion circuit can be configured to isolate (e.g., decouple) the load from the energy source, so that an electrical parameter of the energy source can be measured using a measurement circuit. This can be referred to as obtaining an "open-circuit" measurement, though the energy source need not literally be physically disconnected from the load or open-circuited. For example, an open-circuit terminal voltage of a PEH device can be measured using a fixed (e.g., non-varying) measurement duration where a specified impedance is presented across the terminals of the PEH device by the measurement circuit.

Once the open-circuit voltage is measured, a proportionality constant, (e.g., "K") can be used to establish a desired terminal voltage of the PEH device when under load by multiplying a measured open-circuit voltage by the proportionality constant (or by dividing voltage under load by the proportionality constant and comparing the divided voltage to the measured open-circuit voltage). The power conversion circuit can adjust one or more of a frequency or duration of intervals where the load is connected to the PEH device, or other operating characteristics, such as to converge on the desired terminal voltage of the PEH device under load by adjusting a resistance or impedance presented to the PEH device by the power conversion circuit. This approach can be referred to as a "maximum power point tracking" (MPPT) technique based on open-circuit voltage. The phrase "maximum" does not require that this technique must always converge on a maximum efficiency or an operating point of maximum power transfer, but the technique does seek to enhance power transfer efficiency in a direction towards maximum power transfer and can provide operation at a maximum power transfer point In an example, an electronic circuit can include a rectifier circuit having an input configured to receive a time-varying input signal from a source of input energy. An open-circuit voltage (OCV) sampling circuit can be coupled to the output of the rectifier circuit, the OCV sampling circuit configured to sample a voltage at the output of the rectifier circuit and configured to provide a sampled representation of a rectified open-circuit voltage provided at the output of the rectifier circuit. The electronic circuit can include a regulator circuit coupled to the output of the rectifier circuit, and an isolation switch located between the regulator circuit and the rectifier circuit, the isolation switch configured to isolate the regulator circuit from the rectifier circuit for sampling of the open-circuit voltage by the open-circuit voltage sampling circuit. A first capacitor can be coupled to the output of the rectifier circuit and configured to establish a specified settling time of a signal provided at the output of the rectifier circuit, the first capacitor located on the rectifier side of the isolation switch. A second capacitor having a capacitance value larger than the first capacitor, the second capacitor located at the input of the regulator circuit, the second capacitor isolated from the OCV sampling circuit by the isolation switch. In an illustrative example, the energy source can include a PEH device, and the regulator circuit can include a buck-type regulator topology. But, other regulator topologies such as boost or buck/boost topology can be used, depending on the regulated output voltage to be provided for a particular application. The techniques described elsewhere herein (such as including input capacitor isolation or sample holding capacitor buffering) are equally applicable to regulator circuit topologies other than a buck topology.

If a direct-current energy source is used (such as a photovoltaic device), the rectifier circuit can be omitted. The techniques described herein are applicable to AC or DC energy sources, and the first capacitor can be located at an output of the energy source when a rectifier circuit is omitted (such as in parallel with a clamp diode).

Figure 1:
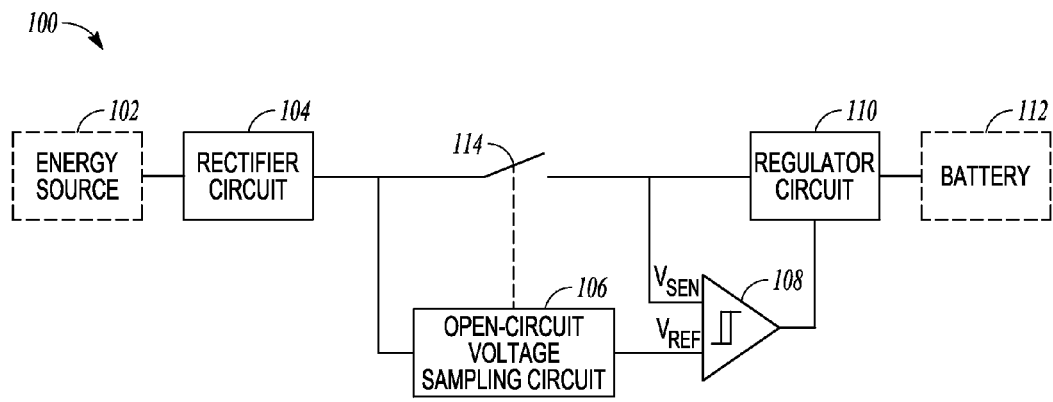
FIG. 1 illustrates generally an example of an electronic circuit that can include a rectifier circuit, an open-circuit voltage sampling circuit, and a regulator circuit.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 illustrates generally an example of an electronic circuit 100 that can include a rectifier circuit 104, an open-circuit voltage sampling circuit 106, and a regulator circuit 110. An energy source 102 can be coupled to the rectifier circuit 104. The energy source 102 can include a piezoelectric energy harvesting (PEH) device, a photovoltaic (PV) device, such as a solar cell or a solar array, or a thermo-electric generator (TEG), as illustrative examples. The rectifier circuit 104 can include an active rectifier circuit or a passive rectifier circuit, such as to rectify a time-varying (e.g., alternating current) signal provided by the energy source 102. For example, the rectifier circuit 104 can include a full-wave rectifier, such as having a bridge configuration as shown and described in relation to other examples herein. If the output of the energy harvesting device is direct-current (DC), the rectifier circuit 104 can be omitted or can include a clamp diode without requiring a full-wave rectifier circuit.

The rectifier circuit 104 can be electrically coupled to the regulator circuit 110, such as through an isolation switch 114 (e.g., a mechanical switch or a solid-state device such as a transistor or transmission gate). The regulator circuit 110 can have an input supplied by the energy source 102 through the rectifier circuit 104, and an output that can be coupled to a load such as a battery 112. Other loads can include one or more of a capacitor, a super capacitor, or other circuitry such as one or more down-stream regulator circuits (e.g., a low dropout regulator (LDO)).

The isolation switch 114 can be controlled such as to isolate the rectifier circuit 104 and energy source 102 from the regulator circuit 110. Such isolation can be used to obtain an electrical measurement from the energy source 102 when the energy source 102 is not loaded by the regulator circuit 110. For example, a rectified open-circuit voltage provided by the rectifier circuit 104 can be measured using an open-circuit voltage sampling circuit 106.

A sampled representation of the rectified open-circuit voltage can be provided to a first input of a comparator 108. During operation of the regulator circuit 110, a voltage provided by the energy source 102 under load can be provided to a second input of the comparator 108. Information indicative of the comparison can be provided to the regulator circuit 110. For example, logic included as a portion of the regulator circuit 110, or coupled to the regulator circuit 110, can establish one or more parameters of operation of the regulator circuit 110.

For example, the comparator 108 can provide an output comprising information indicative of a difference between a scaled representation of the input voltage of the regulator circuit 110 under load as compared to the sampled representation of the rectified open-circuit voltage provided at the output of the rectifier circuit 104. Logic can be used to control the regulator circuit 110 to maintain the input voltage to the regulator circuit 110 at a specified proportion, "K," of the sampled rectified open-circuit voltage. In this manner, the circuit 100 can automatically seek a maximum power transfer point (e.g., providing maximum power point tracking ("MPPT")), such as by obtaining samples of a representation of the open-circuit voltage at specified times, such as periodically.

The electronic circuit can include one or more capacitors, such as a first capacitor connected to an output of the rectifier circuit 104 (or an input of the isolation switch 114), and a second capacitor connected to an input of the regulator circuit 110 (or an output of the isolation switch 114).

Figure 2A:
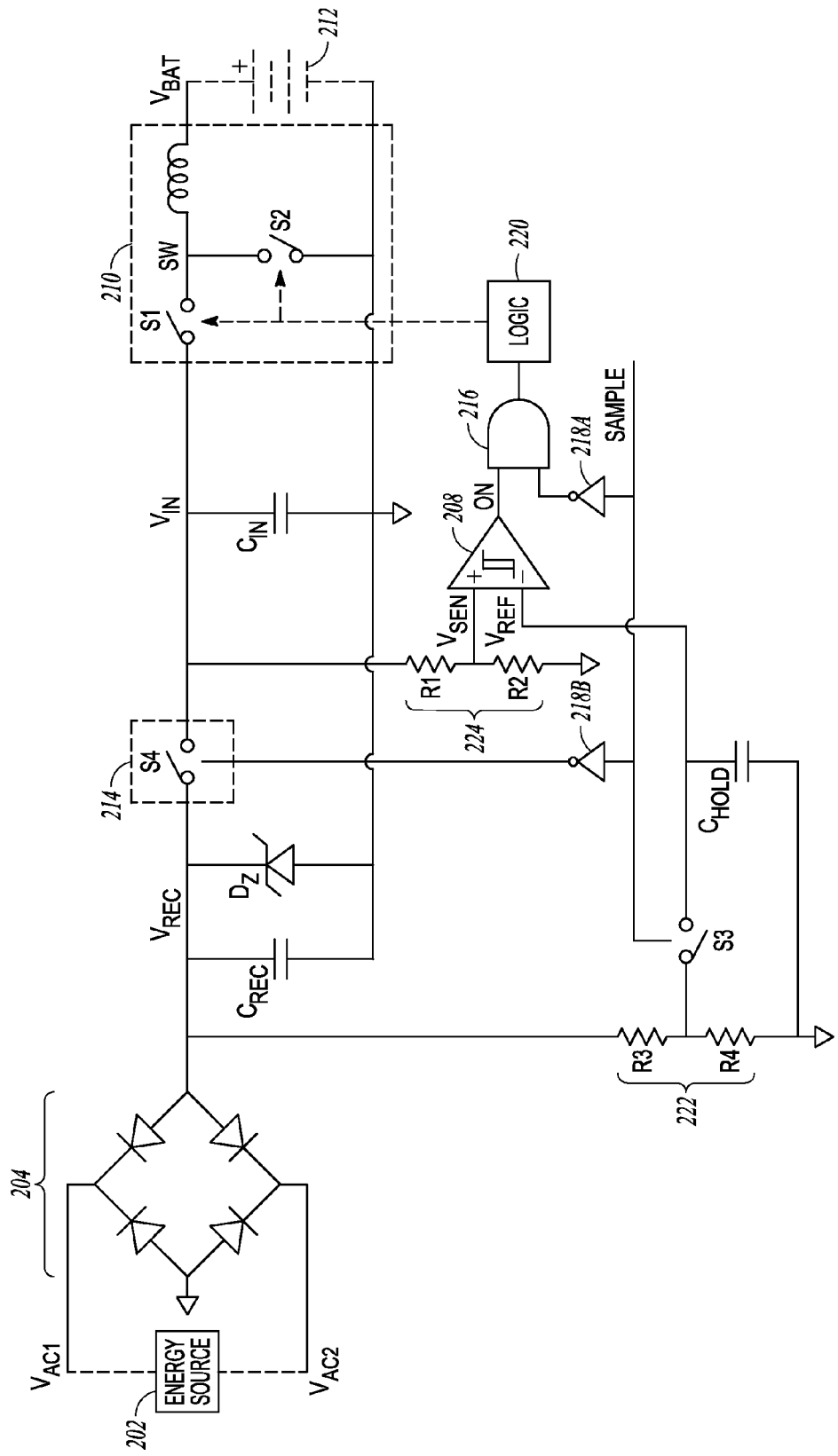
FIG. 2A illustrates generally an example of an electronic circuit that can include a rectifier circuit, an isolation switch, an open-circuit voltage sampling circuit, and a regulator circuit.

FIG. 2A illustrates generally an example of an electronic circuit that can include a rectifier circuit (e.g., a rectifier bridge circuit 204), an isolation switch 214 ("S4"), an open-circuit voltage sampling circuit, and a regulator circuit 210. As mentioned above in relation to FIG. 1, in FIG. 2A, an energy source 202 can be coupled to input nodes $V_{AC1}$ and $V_{AC2}$ of the bridge rectifier circuit 204. A rectified output voltage can be provided at a node, $V_{REC}$, such as provided to an input of the isolation switch 214. The isolation switch 214 (S4) can include a mechanical switch or solid state device, such as a transistor. As an illustrative example, the isolation switch can include one or more field effect transistors (FETs), such as co-integrated or otherwise included in a commonly-shared integrated circuit package along with other portions of the electronic circuit of FIG. 2A.

An input protection circuit can be provided, such as including a diode clamp $D_Z$ or other circuitry, such as to inhibit or suppress excessive voltage at the $V_{REC}$ node. A first capacitor, $C_{REC}$, can be coupled to the $V_{REC}$ node, such as to provide a specified settling time for a voltage transient at the output of the rectifier circuit 204 when the energy source 202 and rectifier circuit 204 are isolated from the regulator circuit 210 using the isolation switch 214.

A second capacitor, $C_{IN}$, can be provided to one or more of filtering the output of the rectifier circuit 204 or to provide transient current supply capability when a load abruptly increases. In one approach, a working frequency of a regulator circuit 210 (e.g., a switching frequency used for a switched-mode buck regulator), can be minimized or reduced to save power. In order to meet transient performance and noise specification (e.g., specified ripple performance), a large value of the input capacitor $C_{IN}$ can be specified. The second capacitor $C_{IN}$ is generally much larger in value (e.g., an order of magnitude or more) than the first capacitor $C_{REC}$.

When portions of the electronic circuit of FIG. 2A are co-integrated or packaged together in a commonly-shared integrated circuit package, the second capacitor $C_{IN}$ can be located "off chip." The first capacitor $C_{REC}$ can also be located "off chip," such as selected or specified to provide a desired settling time when matched with the energy source 202, such as matched to a PEH having specified or measured characteristics. In an illustrative example, when $C_{REC}$ is paired with an energy source 202, such a settling time can include a value selected from a range of about 10 milliseconds (ms) to about 100 milliseconds.

In order to enhance efficiency, a voltage at $V_{REC}$ can be regulated, such as by controlling the voltage regulator 210 to provide a load to the regulator input node $V_{IN}$ in manner that forces $V_{IN}$ to converge on a value comprising a specified proportion of a sampled open-circuit voltage at the $V_{REC}$ node when the regulator circuit 210 from the $V_{REC}$ node. A $V_{IN}$ voltage regulation value can be set at least in part using a resistor divider 224 including first and second resistors R1 and R2. For example, a divider ratio established by the resistors R1 and R2 of the resistor divider 224 can be provided to an input of a comparator circuit 208, where the comparator circuit 208 includes hysteresis. The $V_{SEN}$ node voltage can be compared to a sampled reference voltage (e.g., $V_{REF}$) corresponding to a scaled representation of an open-circuit voltage provided by the energy source 202. The output of the comparator can be provided to logic 220, such as to control the regulator circuit 210 to increase or decrease one or more operating parameters to force the input voltage $V_{IN}$ towards a desired operating value. In this manner, the electronic circuit can track a maximum power transfer point of the energy source 202. For example, when the $V_{SEN}$ node voltage value is higher than the $V_{REF}$ voltage, the regulator circuit 210 can be enabled to provide energy to a load such as a battery 212.

When the regulator circuit 210 is enabled, the charge stored in the second capacitor $C_{IN}$ drops, and the $V_{IN}$ node voltage drops. Accordingly, enabling the regulator circuit 210 or otherwise adjusting the regulator circuit 210 parameters can increase the load presented to the energy source thereby "dragging" $V_{IN}$ down. Similarly, if operation of the regulator circuit 210 is suppressed or otherwise adjusted, $V_{IN}$ can increase under a lighter load condition as $C_{IN}$ is recharged by the energy source 202 through the rectifier 204. For example, when the regulator circuit 210 comprises a switched-mode regulator, switching cycles can be suppressed or a duty cycle or other switching parameters can be adjusted to allow $V_{IN}$ to increase in value.

As an illustrative example, a buck regulator circuit 210 configuration can be used such as where the energy source 202 includes a device such as a PEH providing an AC voltage magnitude above a desired $V_{BAT}$ output voltage. The logic 220 can control one or more switch states such as controlling on on-duration or duty cycle of a first switch S1 and a second switch S2 to charge and dump energy from a storage element such as an inductor (as shown), thereby providing energy to a load (e.g., charging a battery 212). Switching cycles can be suppressed when $V_{SEN}$ exceeds $V_{REF}$. A hysteretic control scheme illustrated generally in the illustration of FIG. 2A can provide high efficiency when used in relatively low-power applications.

An analog representation of a $V_{REF}$ value can be stored using a sampling capacitor, $C_{HOLD}$. When a sample command is provided, such as by asserting a digital control line, SAMPLE, an output of the comparator circuit 208 can be gated, such as to suppress or adjust operation of the regulator circuit 210. Assertion of SAMPLE can also be used to control the isolation switch 214 (S4), isolating the regulator circuit 210 from the rectifier circuit 204 during sampling. In an application involving energy harvesting using a PEH, an open-circuit voltage may take a very long time to settle, due to the size of the $C_{IN}$ capacitor in combination with a large internal resistance and small capacitance presented by the PEH, if no isolation is provided between $V_{REC}$ and the $C_{IN}$ capacitor. In such an approach lacking isolation, a long settling time is needed (e.g., several seconds). Meanwhile, if the desired open-circuit voltage sampling duty cycle is specified to be about 1%, hundreds of the seconds might elapse between open-circuit voltage samples, inhibiting or precluding effective tracking of a maximum power transfer point. Use of the isolation switch 214 tremendously improves settling time by isolating $C_{IN}$ from the $V_{REC}$ node, allowing more frequent sampling of the open-circuit voltage as compared to other approaches.

A sampling switch S3 can be controlled or triggered, using a digital control line (e.g., SAMPLE), such as to impose a voltage provided by a second divider circuit 222 on the sample holding capacitor, $C_{HOLD}$. The voltage stored on $C_{HOLD}$ can be a specified proportion of the open-circuit voltage at the node $V_{REC}$ when isolated from the regulator circuit 210 by the isolation switch 214 (S4).

By asserting SAMPLE, or using other control techniques, the open-circuit voltage at $V_{REC}$ can be sensed at specified times (such as periodically at a duty cycle of about 1% to about 2%, for example), without significantly impacting the efficiency of the energy harvesting circuit. When using a PEH, a proportionality constant, K, can be established at about 0.5, such as by specifying R4/(R3+R4) to be about half of R2/(R1+R2), to provide maximum power point tracking. In an illustrative example, the divider circuit 222 can provide a voltage division ratio of about 10 to 1 (10:1). The proportionality constant, K, can be adjusted depending on the application or type of energy harvesting device. For example, K can be adjusted automatically in response to a measured change in one or more of vibration or temperature in the environment around the energy source. In other examples, K is fixed and established using information about the application environment or known characteristics of the energy source.

As mentioned above, certain elements of the energy harvesting circuit can be co-integrated as a portion of a commonly-shared integrated circuit, and other components can be located elsewhere. Leakage of integrated circuit pad cell circuitry (e.g., an electrostatic discharge protection cell) or other factors such as internal leakage can cause a stored analog representation of the open-circuit voltage to droop over time. To reduce error in the stored representation of the open-circuit voltage, a very large $C_{HOLD}$ capacitor value can be selected, such as corresponding to a $C_{HOLD}$ capacitor located off-chip.

Accordingly, as the $C_{HOLD}$ capacitor value increases, a settling time before an accurate open-circuit voltage sample can be obtained also generally increases. Values for the resistors R3 and R4 in the divider circuit 222 are specified to be generally large to avoid unwanted power dissipation in the divider circuit 222. Such power dissipation erodes efficiency and also creates error in the open-circuit voltage measurement by presenting the $V_{REC}$ node with an unwanted load. But, if R3 and R4 have large values, a large time constant is established by the combination of the divider circuit 222 and the $C_{HOLD}$ capacitor. In one approach, several sample cycles can occur before $C_{HOLD}$ is charged to an accurate representation of the open-circuit voltage at $V_{REC}$. As long as the droop induced in $C_{HOLD}$ is less than the voltage imposed during sample, $C_{HOLD}$ will eventually charge up to an accurate voltage representative of the open-circuit voltage at $V_{REC}$ over several sample intervals. However, such an approach fails to perform efficiently under changing load conditions, changing input conditions, or particularly if a duration between samples is long (e.g., hundreds of seconds).

As mentioned above, a settling time for an open-circuit voltage measurement can be controlled in part by isolating $C_{IN}$ from the $V_{REC}$ node, and by specifying a size of the $C_{REC}$ capacitor based at least in part on the type of energy harvester used. Such a shortened settling time facilitates acquisition of an accurate representation of the open-circuit voltage on $C_{HOLD}$ in as little time as a single sampling cycle. However, the present inventor has also recognized that a smaller value of $C_{HOLD}$ can also be used when using an isolation scheme between $C_{IN}$ and $C_{REC}$, because sampling events can be triggered more frequently using the shortened settling time offered by $C_{REC}$. This results in less duration between open-circuit voltage measurements, and therefore less time for voltage droop to occur on $C_{HOLD}$. Also, by sampling the open-circuit voltage at $V_{REC}$ more frequently, the energy harvesting circuit becomes more efficient at tracking changing input or load conditions.

The first capacitor can be referred to as a "rectification" capacitor, such as to provide a specified settling time for a voltage transient at the output of the rectifier circuit 104 when the energy source 102 and rectifier circuit 104 are isolated from the regulator circuit 110 for an open-circuit voltage measurement. The second capacitor can be provided to provide a charge reservoir for one or more of filtering the output of the rectifier circuit 104 or to provide transient current supply capability when the load abruptly increases. For these reasons, the second capacitor is generally much larger in value (e.g., an order of magnitude or more) than the first capacitor.

Figure 2B:
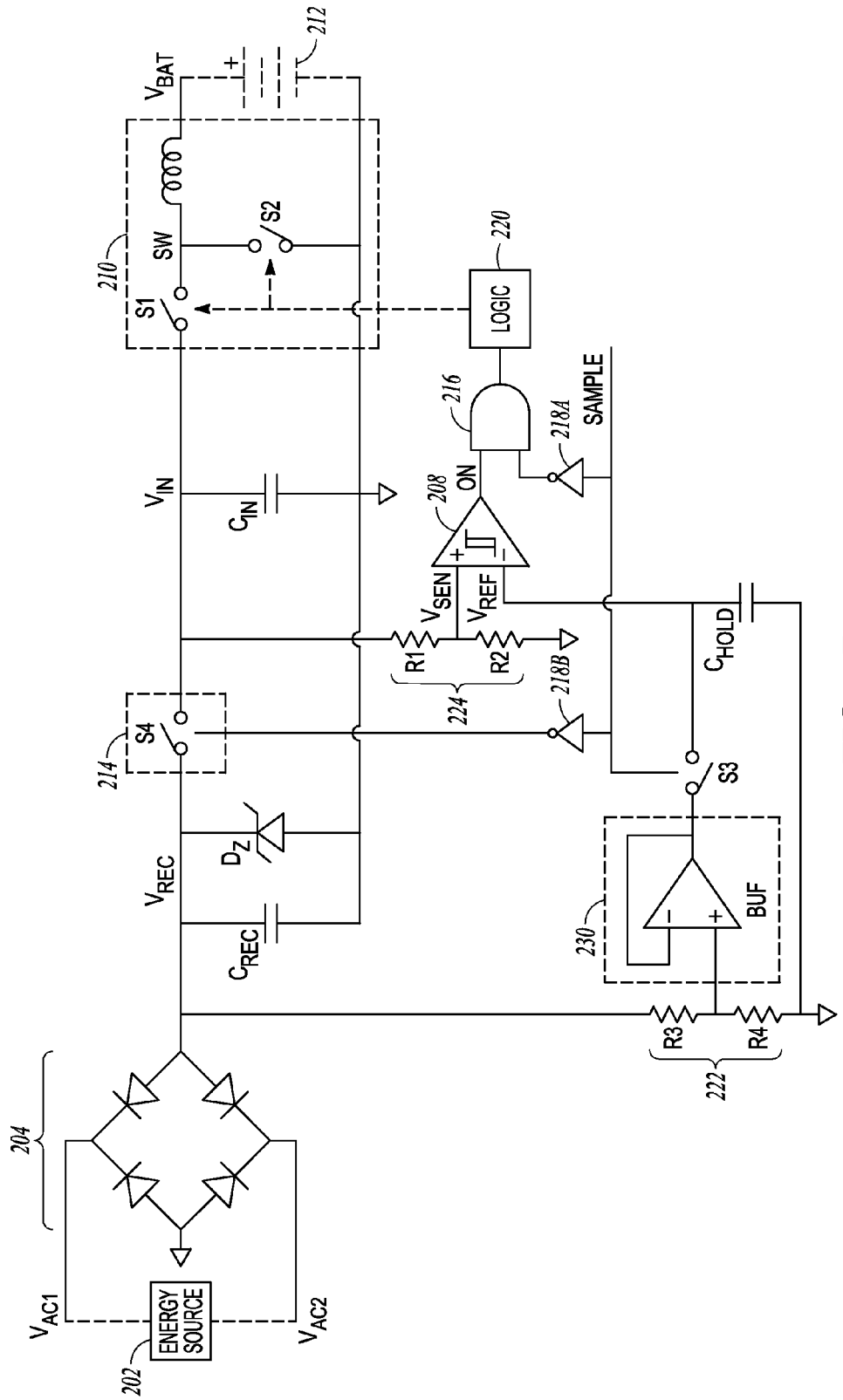
FIG. 2B illustrates generally an example of an electronic circuit that can include a rectifier circuit, an isolation switch, a buffered open-circuit voltage sampling circuit, and a regulator circuit.

FIG. 2B illustrates generally an example of an electronic circuit that is similar to FIG. 2A, such as can include a rectifier circuit 204 that is coupled or coupleable to an energy source 202. The electronic circuit can include a clamp diode, $D_Z$, a rectification capacitor $C_{REC}$, an isolation switch 214 (e.g., S4), an input capacitor $C_{IN}$, and a regulator circuit 210, such as including one or more of first and second switches S1 and S2, and an inductor. The electronic circuit of FIG. 2B can include logic 220 coupled to the regulator circuit 210, such as configured to control one or more operating parameters to force the input voltage $V_{IN}$ towards a desired operating value. In this manner, the electronic circuit can track a maximum power transfer point of the energy source 202. The logic can be coupled to a comparator 208, such as using one or more gates (e.g. a gate 216) or inverters such as a first inverter 218A or a second inverter 218B. The comparator can include a first input (e.g., $V_{SEN}$) coupled to an input node of the regulator circuit $V_{IN}$, such as using a first resistor divider circuit 224. A second input of the comparator circuit 208 (e.g., a node $V_{REF}$) can be coupled to a sampling capacitor $C_{HOLD}$. As in the example of FIG. 2A, the sampling capacitor $C_{HOLD}$ can store an analog representation of a sampled open-circuit voltage, such as a scaled representation of a voltage at the rectifier output node $V_{REC}$ when $V_{REC}$ is isolated from $V_{IN}$ using the isolation switch 214 (e.g. S4).

As mentioned above in relation to the illustrative example of FIG. 2A, if $C_{HOLD}$ is located off-chip with respect to other portions of an energy harvesting circuit, leakage of the integrated circuit pin circuitry such as a pad electrostatic discharge cell can cause a stored voltage on $C_{HOLD}$ to droop over time, particularly if the $V_{REF}$ voltage stored on $C_{HOLD}$ is to be held without refresh for several seconds. Illustrative examples of leakage currents at the $V_{REF}$ node can include about 100 picoamperes (pA) in a normal ambient temperature range, and up to several nanoamperes (nA) or more at elevated operating temperatures. Use of a large $C_{HOLD}$ value can help to reduce sampled voltage error induced by leakage, but if a large $C_{HOLD}$ value is used, as mentioned elsewhere above, settling times can be long enough to preclude frequent sampling of the open-circuit voltage at $V_{REC}$, such as reducing or inhibiting effective tracking of a maximum power transfer point.

The present inventor has recognized, among other things, that a voltage buffer circuit 230 (e.g., BUF) can be used, such as placed in-line with a divider circuit 222. In this manner, the voltage buffer circuit 230 can provide a low output impedance, such as isolating $C_{HOLD}$ from R3 and R4, so that a large value for $C_{HOLD}$ can still be used, along with large values of R3 and R4, without resulting in an unacceptably long settling time.

Figure 3A:
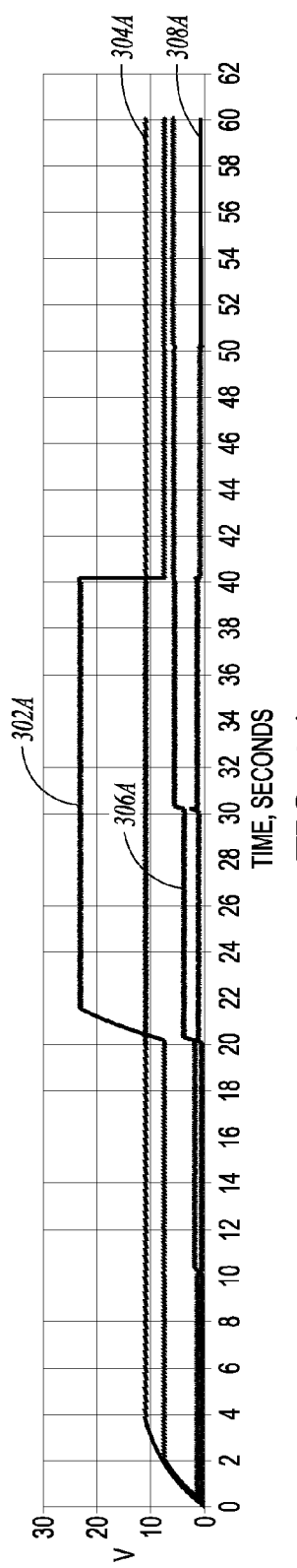
FIG. 3A shows various illustrative examples of regulator circuit input voltages that can be provided using various circuit topologies, such as can include the topologies illustrated generally in FIG. 2A and FIG. 2B.
Figure 3B:
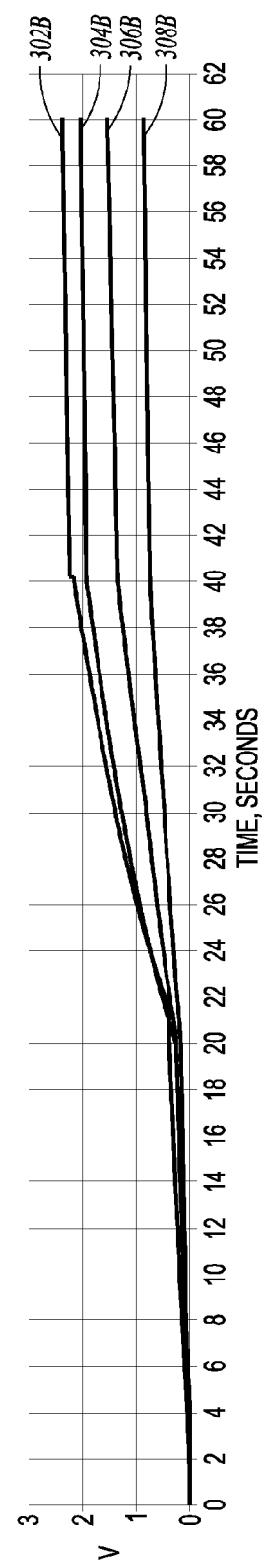
FIG. 3B shows various illustrative examples of regulator circuit output voltages that can be provided by using various circuit topologies, such as can include the topologies illustrated generally in FIG. 2A and FIG. 2B.

FIG. 3A shows various illustrative examples of regulator circuit input voltage ($V_{IN}$) values that can be provided using various circuit topologies, such as can include the topologies illustrated generally in FIG. 2A and FIG. 2B. For example, according to simulation, the circuit of FIG. 2A (including $C_{IN}$ capacitor isolation) can provide input voltage 306A, and the circuit of FIG. 2B can provide the input voltage 302A (including $C_{IN}$ capacitor isolation and $C_{HOLD}$ capacitor buffering). By way of comparison, according to simulation, a circuit using a fixed open-circuit voltage ratio (e.g., a fixed $V_{REF}$ value) can provide the input voltage 304A, and a circuit using a sampled open-circuit voltage lacking isolation of $C_{IN}$ and lacking a buffered coupling between a divider circuit and $C_{HOLD}$ can provide the input voltage 308A. FIG. 3B shows various illustrative examples of regulator circuit output voltages ($V_{BAT}$) that can be provided by using various circuit topologies, such as can include the topologies illustrated generally in FIG. 2A and FIG. 2B. The $V_{BAT}$ plot 302B shows the most rapid charging, corresponding to the plot 302A of $V_{REF}$ from FIG. 3A, as provided by the circuit of FIG. 2A (including sample capacitor $C_{HOLD}$ buffering and isolation of input capacitor $C_{IN}$).

The $V_{BAT}$ plot 304B also shows more rapid charging than is shown in $V_{BAT}$ plot 306B. This can be explained by the long settling time associated with use of sampled-open-circuit voltage technique where $C_{HOLD}$ is not buffered (as shown in plot $V_{REF}$ plot 306A of FIG. 3A where the $V_{REF}$ voltage takes several cycles to converge on the appropriate $V_{REF}$ value, as indicated by the stair-step appearance). The $V_{BAT}$ plot 308B of FIG. 3B shows the worst comparative performance, corresponding to a harvesting circuit topology lacking $C_{HOLD}$ buffering and lacking $C_{IN}$ isolation (and corresponding to the $V_{REF}$ plot 308A of FIG. 3A).

Figure 3C:
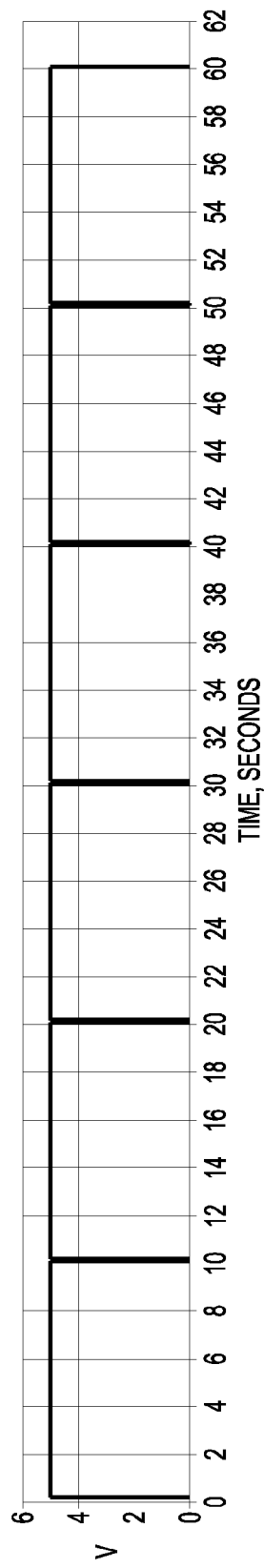
FIG. 3C shows an illustrative example of an open-circuit voltage sample control signal, such as corresponding to the illustrative examples of FIG. 3A, FIG. 3B, and FIG. 3D.
Figure 3D:
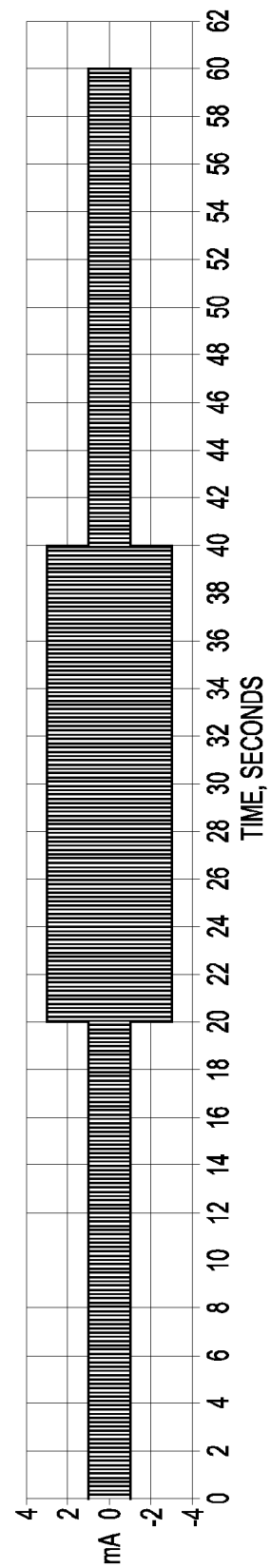
FIG. 3D shows an illustrative example of a piezoelectric energy harvester (PEH) short circuit current, such as corresponding to the illustrative examples of FIG. 3A, FIG. 3B, and FIG. 3C.

FIG. 3C shows an illustrative example of an open-circuit voltage sample control signal, such as corresponding to the time scale of the illustrative examples of FIG. 3A, FIG. 3B, and FIG. 3D. The waveform shown in FIG. 3C can represent /SAMPLE (e.g., an inverted representation of the signal SAMPLE). The performance of the harvesting circuit of FIG. 2A can be improved such as by one or more of extending a sample duration (e.g., a duration during which SAMPLE is asserted), or decreasing an interval between sample events, such as to converge $V_{REF}$ (e.g., plot 306A in FIG. 3A) more rapidly on a target value. For example, use of a fixed $V_{REF}$ value (corresponding to plot 304A of FIG. 3A and $V_{BAT}$ charging waveform 304B of FIG. 3B) appears to outperform the charging performance of the circuit shown in FIG. 2A. However, this can be attributed to the short sample durations shown in FIG. 3C. For applications where the input energy source conditions do not change rapidly, the approach of isolating $C_{IN}$ without buffering the sample capacitor $C_{HOLD}$ (as in the circuit of FIG. 2A) can offer greater power transfer efficiency despite a long settling time associated with charging $C_{HOLD}$ during sampling.

FIG. 3D shows an illustrative example of a piezoelectric energy harvester (PEH) short circuit current, such as corresponding to the time scale of the illustrative examples of FIG. 3A, FIG. 3B, and FIG. 3C.

Figure 4:
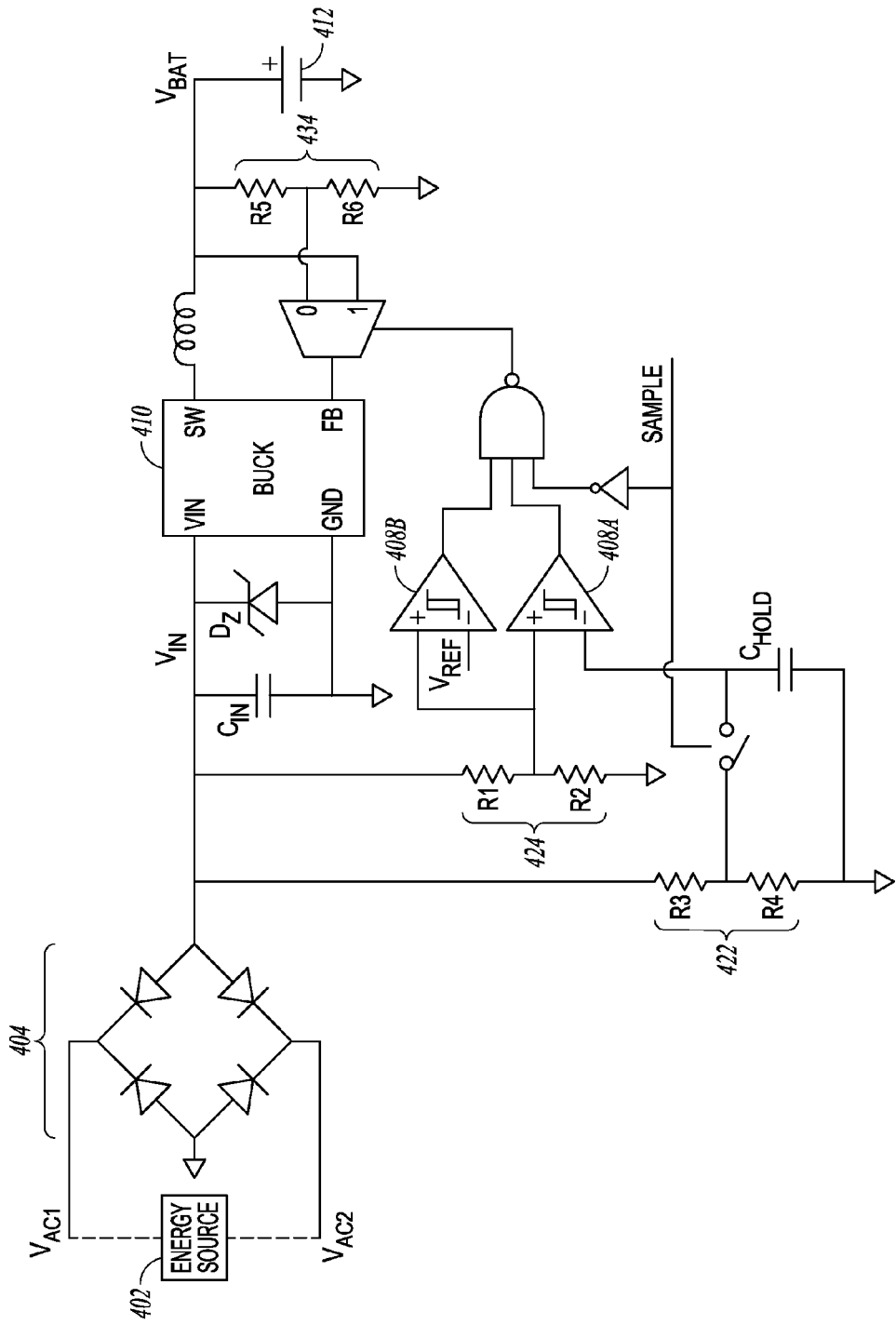
FIG. 4 illustrates generally an example of an electronic circuit that can include using an integrated buck-type regulator circuit, such as a commercially-available buck-type regulator circuit, to implement a maximum power point tracking (MPPT) tracking scheme using an open-circuit voltage measurement technique.

FIG. 4 illustrates generally an example of an electronic circuit that can include using an integrated buck-type regulator circuit 410, such as a commercially-available buck-type regulator circuit, to implement a maximum power point tracking (MPPT) tracking scheme using an open-circuit voltage measurement technique. As in the examples of FIG. 2A and FIG. 2B, an energy source 402 providing AC outputs $V_{AC1}$ and $V_{AC2}$ can be coupled to a rectifier circuit 404. An output of the rectifier circuit can be provided to an input capacitor $C_{IN}$ (without isolation in the example of FIG. 4). A clamp diode DZ can be included to prevent subjecting a $V_{IN}$ node of the buck regulator 410 to excessive input voltage.

A first voltage divider 424 can include resistors R1 and R2, such as coupled to inputs of first and second comparator circuits 408A and 408B. The first comparator circuit 408A can include another input coupled to a sample holding capacitor, $C_{HOLD}$. The sample holding capacitor can be configured to store an analog representation of a sampled open circuit voltage, such as a voltage provided at an output of a voltage divider circuit 422. Switching cycles of the buck regulator 410 can be suppressed during sampling, such as by controlling a feedback input (FB) in response to a sample control signal, SAMPLE. For example, during sampling of an open-circuit voltage provided by the rectifier circuit 404, switching cycles of the buck regulator circuit 410 can be suppressed by bypassing a feedback divider circuit 434 (including resistors R5 and R6) and connecting the regulator circuit 410 feedback input directly to an output node $V_{BAT}$.

When SAMPLE is de-asserted, the feedback input FB can be connected to the divider circuit 434 resulting in normal regulator circuit 410 operation. Regulator circuit switching cycles can be suppressed using an output of either one of the comparator circuits 408A or 408B. For example, the first comparator circuit 408A can be used to force the $V_{IN}$ voltage to a specified ratio of a sampled open-circuit voltage using the stored representation of the open-circuit voltage from $C_{HOLD}$ as a threshold. The second comparator circuit 408B can be used to suppress regulator switching cycles of $V_{IN}$ dips below some minimum voltage established using the a fixed reference $V_{REF}$ voltage. In this manner, a maximum power point tracking scheme can be implemented using an off-the-shelf integrated buck regulator circuit 410. The circuit of FIG. 4 can be enhanced such as by one or more of providing an isolation switch between $V_{IN}$ and an output of the rectifier circuit 404, or by including a buffer circuit between the divider circuit 422 output and the $C_{HOLD}$ sample storage capacitor, in a manner similar to other examples described herein.

Figure 5A:
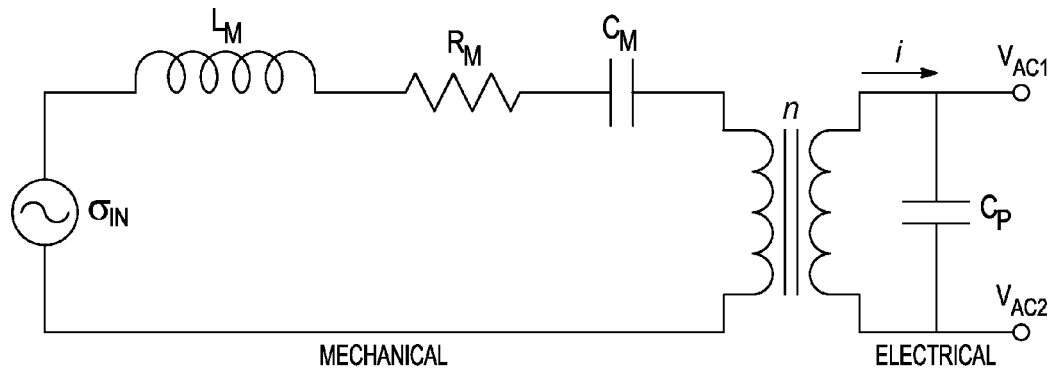
FIG. 5A illustrates generally a first example of an equivalent circuit that can model an energy source such as piezoelectric energy harvesting (PEH) device, including a circuit portion corresponding to a mechanical behavior of the PEH device, and a circuit portion corresponding to an electrical behavior of the PEH device.

FIG. 5A illustrates generally a first example of an equivalent circuit that can model an energy source such as piezoelectric energy harvesting (PEH) device, including a circuit portion corresponding to a mechanical behavior of the PEH device, and a circuit portion corresponding to an electrical behavior of the PEH device. The mechanical portion of the PEH device can be represented as a mechanical spring-mass-damper system, where $L_M$ can represent the mechanical mass, $C_M$ can represent the spring stiffness, and $R_M$ can represent a damping effect (e.g., mechanical loss), excited by an input mechanical force represented by $\sigma_{IN}$. A current, i, can be provided in response to the input force, such as provided using a model including a coupled inductor structure (e.g., a transformer) having a turns ratio, n. An electrical portion of the PEH device structure can be modeled as a parallel capacitance, $C_P$, coupled between output nodes $V_{AC1}$ and $V_{AC2}$.

Figure 5B:
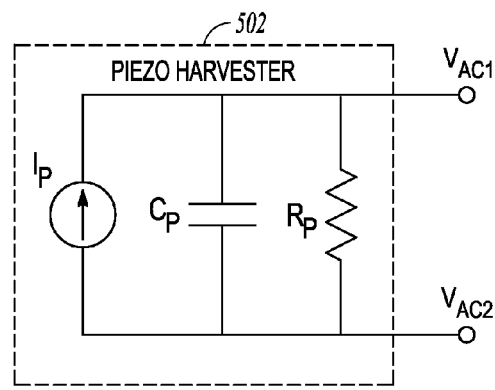
FIG. 5B illustrates generally an example that can include an equivalent circuit that can electrically model a PEH device.

FIG. 5B illustrates generally an example that can include an equivalent circuit 502 that can electrically model a PEH device. In FIG. 5B, the electrical portion of the PEH device structure can again be labeled as a parallel capacitance, $C_P$, coupled between output nodes $V_{AC1}$ and $V_{AC2}$, and such a capacitance can be coupled in parallel with a resistance, $R_P$. An AC current source can provide a current, $i_P$, in response to mechanical energy coupled to the transducer. In generally-available PEH devices, an amplitude of the AC current source is dependent on the acceleration level (e.g., "g" level) induced by vibration. The parallel capacitance $C_P$ is generally on the order of about about tens of nanoFarads (nF) to hundreds of nF, the parallel resistance $R_P$ is on the order of tens of kiloOhms (kΩ).

Figure 5C:
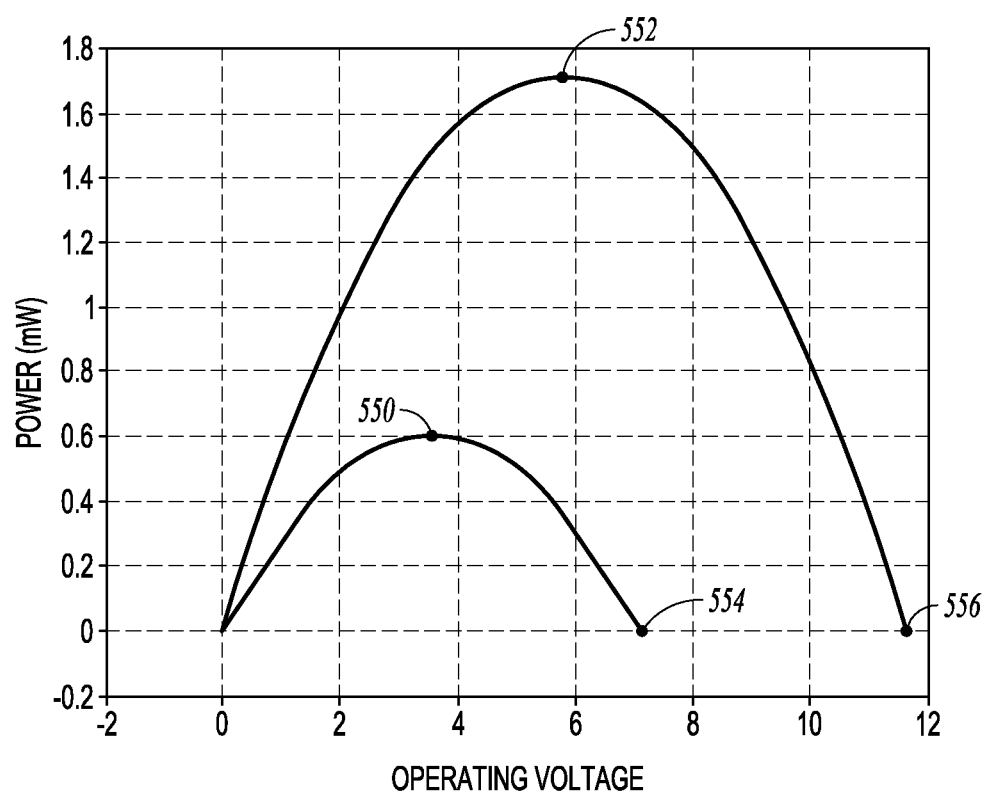
FIG. 5C shows illustrative examples of power-voltage relationships for energy sources that can include PEH devices, illustrating generally that an operating voltage value corresponding to maximum power transfer is generally about half the value of an open-circuit voltage.

FIG. 5C shows illustrative examples of power-voltage relationships for energy sources that can include PEH devices, illustrating generally that operating voltage values 550 and 552 corresponding to maximum power transfer are generally about half the value of the open-circuit voltages 554 and 556. Such a ratio between the open-circuit voltages and the maximum power transfer operating voltages can be referred to as a proportionality constant "K," as mentioned in other examples herein.

As shown in FIG. 5C, for PEH devices, an open-circuit voltage of the Piezo harvester is generally greater in magnitude than about 5V, so a buck regulator topology is generally coupled to the PEH device for power conditioning, such as to provide a regulated output voltage having a magnitude less than 5V for powering other devices or charging a battery, as an illustrative example. Other regulator topologies such as boost or buck/boost topology can be used, depending on the regulated output voltage to be provided for a particular application. The techniques described elsewhere herein (such as including input capacitor, $C_{IN}$, isolation or sample holding capacitor, $C_{HOLD}$, buffering) are equally applicable to regulator circuit topologies other than a buck topology.

Figure 6:
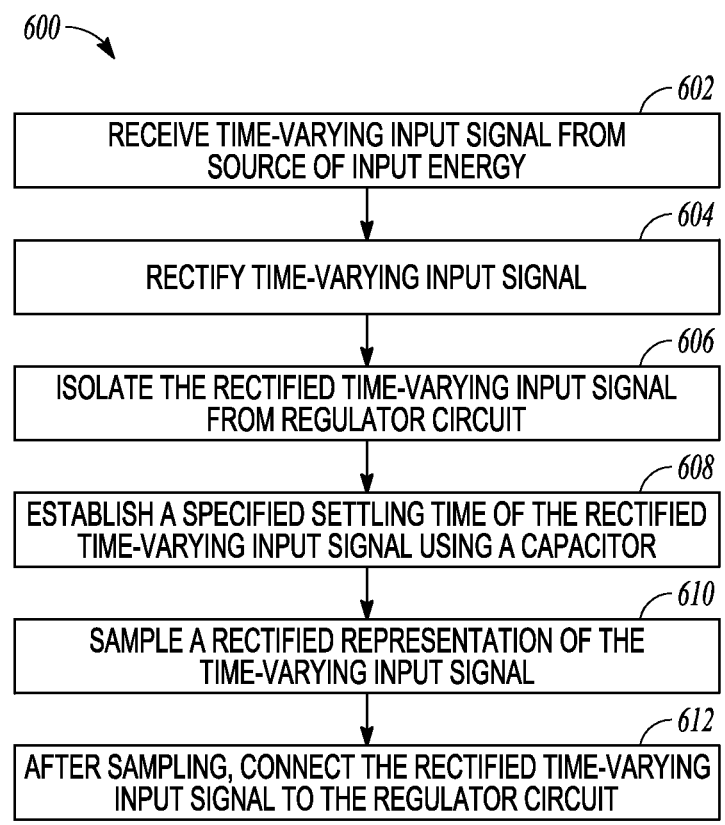
FIG. 6 illustrates generally a technique, such as a method, that can include providing a rectification capacitor to control settling time for determination of an open-circuit voltage provided by an energy harvesting device.

FIG. 6 illustrates generally a technique 600, such as a method, that can include providing a rectification capacitor to control settling time for determination of an open-circuit voltage provided by an energy harvesting device. At 602, a time-varying input signal can be received from a source of input energy, such as an energy harvesting device. At 604, the time-varying input signal can be rectified, such as using a full-wave rectifier circuit. At 606, the rectified time-varying input signal can be isolated from a regulator circuit, such as to provide a rectified open-circuit voltage. At 608, a specified settling time for the rectified time-varying input signal can be established using a first capacitor. At 610, such as after the specified settling time, a rectified representation of the time-varying input signal (e.g., an open-circuit voltage) can be sampled. At 612, after sampling, the rectified time-varying input signal can be connected to the regulator circuit.

Connecting the rectified time-varying input signal to the regulator circuit can include connecting the input signal to a filter circuit comprising a second capacitor having a capacitance value larger than the first capacitor, the second capacitor isolated from the rectified time-varying input signal when the rectified time-varying input signal is isolated from the regulator circuit. In an example, at 610, a rectified representation of the time-varying input signal can be sampled using a combination of a divider circuit to provide a scaled representation of the rectified time-varying input signal, and an output of the divider circuit can be provided to a buffer circuit. The buffer circuit can then provide a buffered representation of the scaled representation to a sample holding capacitor during sampling, to store the scaled representation.

Additional Notes

Each of the non-limiting examples discussed in this document can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electronic circuit, comprising:
    a rectifier circuit including an input configured to receive a time-varying input signal from a source of input energy;
    an open-circuit voltage (OCV) sampling circuit coupled to the output of the rectifier circuit, the OCV sampling circuit configured to sample a voltage at the output of the rectifier circuit and configured to provide a sampled representation of a rectified open-circuit voltage provided at the output of the rectifier circuit;
    a regulator circuit coupled to the output of the rectifier circuit;
    an isolation switch located between the regulator circuit and the rectifier circuit, the isolation switch configured to isolate the regulator circuit from the rectifier circuit for sampling of the open-circuit voltage by the open-circuit voltage sampling circuit;
    a first capacitor coupled to the output of the rectifier circuit and configured to establish a specified settling time of a signal provided at the output of the rectifier circuit, the first capacitor located on the rectifier side of the isolation switch;
    a second capacitor having a capacitance value larger than the first capacitor, the second capacitor located at the input of the regulator circuit, the second capacitor isolated from the OCV sampling circuit by the isolation switch.

2. The electronic circuit of claim 1, wherein the OCV sampling circuit comprises a first divider circuit, a sampling switch, and a sample holding capacitor.

3. The electronic circuit of claim 2, wherein the sampling switch is coupled between an intermediate node of the first divider circuit and the sample holding capacitor.

4. The electronic circuit of claim 2, wherein the sample holding capacitor is located externally to an integrated circuit assembly housing one or more of the regulator circuit or the OCV sampling circuit.

5. The electronic circuit of claim 1, wherein the specified settling time is specified to include a value from a range from about 10 milliseconds (ms) to about 100 ms.

6. The electronic circuit of claim 2, wherein the OCV sampling circuit comprises a buffer circuit, the buffer circuit configured to provide a buffered analog representation of the rectified open-circuit voltage at the output of the rectifier; and wherein the OCV sampling circuit is configured to sample the buffered representation of the rectified open-circuit voltage.

7. The electronic circuit of claim 1, comprising a comparator circuit including:

inputs coupled to the input of the regulator circuit and the open-circuit voltage sampling circuit;

an output configured to provide information indicative of a difference between a scaled representation of the input voltage of the regulator circuit under load as compared to the sampled representation of the rectified open-circuit voltage provided at the output of the rectifier circuit, the output coupled to control logic coupled to the regulator circuit; and wherein the electronic circuit comprises a logic circuit configured to control the regulator circuit to maintain the input voltage to the regulator circuit at a specified proportion of the sampled rectified open-circuit voltage.

8. The electronic circuit of claim 1, comprising the source of energy, wherein the source of energy includes a piezoelectric energy harvesting (PEH) device.

9. The electronic circuit of claim 1, wherein the regulator circuit comprises a switching regulator topology.

10. The electronic circuit of claim 9, wherein the OCV sampling circuit comprises or is coupled to a logic circuit configured to suppress switching activity within the regulator circuit during OCV sampling.

11. An electronic circuit, comprising:

a rectifier circuit including an input configured to receive a time-varying input signal from a source of input energy;

an open-circuit voltage (OCV) sampling circuit coupled to the output of the rectifier circuit, the OCV sampling circuit configured to sample a voltage at the output of the rectifier circuit and configured to provide a sampled representation of a rectified open-circuit voltage provided at the output of the rectifier circuit;

a regulator circuit coupled to the output of the rectifier circuit;

an isolation switch located between the regulator circuit and the rectifier circuit, the isolation switch configured to isolate the regulator circuit from the rectifier circuit for sampling of the open-circuit voltage by the open-circuit voltage sampling circuit;

a first capacitor coupled to the output of the rectifier circuit and configured to establish a specified settling time of a signal provided at the output of the rectifier circuit, the first capacitor located on the rectifier side of the isolation switch;

a second capacitor having a capacitance value larger than the first capacitor, the second capacitor located at the input of the regulator circuit, the second capacitor isolated from the OCV sampling circuit by the isolation switch;

a comparator circuit including:

inputs coupled to an input of the regulator circuit and the open-circuit voltage sampling circuit; and an output configured to provide information indicative of a difference between a scaled representation of the input voltage to the regulator circuit under load as compared to the sampled representation of the rectified open-circuit voltage provided at the output of the rectifier circuit, the output coupled to control logic coupled to the regulator circuit; and a logic circuit configured to control the regulator circuit to maintain the input voltage to the regulator circuit at a specified proportion of the sampled rectified open-circuit voltage;

wherein the source of energy includes a piezoelectric energy harvesting (PEH) device; and wherein the regulator circuit comprises a switching regulator topology.

12. A method for operating an energy harvesting circuit, comprising:

receiving a time-varying input signal from a source of input energy;

rectifying the time-varying input signal;

isolating the rectified time-varying input signal from a regulator circuit;

establishing a specified settling time of the rectified time-varying input signal using a first capacitor when the rectified time-varying input signal is isolated from the regulator circuit;

sampling a rectified representation of the time-varying input signal using an open-circuit voltage (OCV) sampling circuit, when the rectified representation is isolated from a regulator circuit, to provide a sample representation of a rectified open-circuit voltage; and after sampling, connecting the rectified time-varying input signal to the regulator circuit, including filtering the rectified time-varying input signal using a second capacitor having a capacitance value larger than the first capacitor, the second capacitor isolated from the OCV sampling circuit when the rectified time-varying input signal is isolated from the regulator circuit.

13. The method of claim 12, wherein the specified settling time is specified to include a value from a range from about 10 milliseconds (ms) to about 100 ms.

14. The method of claim 12, wherein sampling the rectified representation of the time-varying input signal includes buffering the rectified open-circuit voltage and sampling a buffered analog representation of the rectified open-circuit voltage.

15. The method of claim 12, comprising comparing a scaled representation of an input voltage to the regulator circuit under load to the sampled representation of the rectified open-circuit voltage to provide information indicative of a difference between the scaled representation of the input voltage to the regulator circuit under load as compared to the sampled representation of the rectified open-circuit voltage provided at the output of the rectifier circuit; and controlling regulator circuit to maintain an input voltage to the regulator circuit corresponding at a specified proportion of the sampled rectified open-circuit voltage.

16. The method of claim 12, wherein the source of energy includes a piezoelectric energy harvesting (PEH) device.

17. The method of claim 12, wherein the regulator circuit comprises a switching regulator topology.

18. The method of claim 17, wherein the regulator circuit uses a hysteresis-based control scheme.

19. The method of claim 17, wherein the regulator circuit comprises a buck regulator topology.

20. The method of claim 17, comprising suppressing switching activity within the regulator circuit during OCV sampling.

* * * * *